United States Patent
Wielstra et al.

(12)

(10) Patent No.: US 6,331,206 B1
(45) Date of Patent: *Dec. 18, 2001

(54) LACQUER COMPOSITION

(75) Inventors: Ytsen Wielstra; Jolanda H. S. Winkel, both of Drachten (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/976,518

(22) Filed: Nov. 21, 1997

(30) Foreign Application Priority Data

Nov. 22, 1996 (EP) ................................. 96203288

(51) Int. Cl.$^7$ ................................. C09D 183/06
(52) U.S. Cl. ............................ 106/287.13; 106/287.16; 30/32; 528/26; 427/387; 428/447
(58) Field of Search ................ 106/287.13, 287.16; 30/32; 528/26; 427/387; 428/447

(56) References Cited

U.S. PATENT DOCUMENTS

| | | |
|---|---|---|
| 3,780,132 | 12/1973 | Lohr ........................ 260/831 |
| 3,922,440 | 11/1975 | Wegwerth et al. ............ 428/437 |
| 4,027,073 | 5/1977 | Clark ........................ 428/412 |
| 4,081,421 | 3/1978 | Yoshida et al. ........... 260/32.8 EP |
| 4,355,135 | 10/1982 | January ..................... 524/767 |
| 4,390,373 | * 6/1983 | White et al. ............. 106/287.12 |
| 4,442,168 | 4/1984 | White et al. ............... 428/331 |
| 4,485,130 | 11/1984 | Lampin et al. ............. 427/387 |
| 4,594,290 | 6/1986 | Fishcer et al. ............. 428/212 |
| 4,756,827 | 7/1988 | Mayer ....................... 210/170 |
| 5,013,788 | * 5/1991 | Nagashima et al. .......... 524/767 |
| 5,036,145 | 7/1991 | Echterling et al. .......... 525/431 |
| 5,120,811 | 6/1992 | Glotfelter et al. .......... 523/25 |
| 5,178,675 | * 1/1993 | Sexsmith .................. 106/287.11 |
| 5,314,947 | * 5/1994 | Sawaragi ................... 524/780 |
| 5,316,791 | 5/1994 | Farber et al. .............. 427/464 |
| 5,322,888 | * 6/1994 | Kato et al. ................ 524/783 |
| 5,789,476 | * 8/1998 | Iryo et al. ................. 524/430 |

FOREIGN PATENT DOCUMENTS

| | | |
|---|---|---|
| 2071692 | 12/1992 | (CA) . |
| 4118826 | 12/1991 | (DE) . |
| 4020316 | 1/1992 | (DE) . |
| 0526975 | 2/1993 | (EP) . |
| 58-141250 | 8/1983 | (JP) . |
| 446975 | 2/1992 | (JP) . |
| 4198379 | 7/1992 | (JP) . |
| WO 95/16522 | 6/1995 | (WO) . |
| WO 96/29154 | 9/1996 | (WO) . |

OTHER PUBLICATIONS

"Silane Coupling Agents", by Edwin P. Plueddemann, pp. 41–45. 1982.

"Introduction to Polymers", by R.J. Young and P.A. Lovell, p. 38. 1994.

Chemical Abstract, vol. 126, No. 1, Jan. 1, 1997, Columbus Ohio, US; Abstract No. 9335, Kato, H., E.A.: "Siloxane coating compositions with improved resistance to abrasion, UV, and heat for plastic optical materials"XP002075220 (see abstract & JP 08 239 627 A (Ito Optical Ind Co. Ltd.).

"Cycloaliphatic Epoxide Based Sol–Gel Derived Materials"; Better Ceramics Through Chemistry VI, Material Research Society Symposium Proceedings, 1994, V.346 Sigel, Domszy and Welch.

"New Type of a Sol–Gel–Derived Inorganic–Organis Nanocomposite"; Better Ceramic Through Chemistry VI, Material Research Society Symposium Proceedings, 1994, V. 346 Kasemann, Schmidt, Wintrich.

* cited by examiner

Primary Examiner—Margaret G. Moore
(74) Attorney, Agent, or Firm—Ernestine C. Bartlett (57) ABSTRACT

The invention relates to a novel hybrid lacquer composition, which can be obtained by treating an organosilane compound with water in the presence of a polycarboxylic acid which functions both as a catalyst and as a crosslinking agent. The lacquer composition can be prepared, in a simple manner in a short period of time and has a good pot life. Lacquer coatings obtained by thermally curing the lacquer composition exhibit good optical properties as well as a good wear-resistance and chemical resistance. The lacquer composition adheres well to polar synthetic-resin substrates. Apolar synthetic resin substrates require the use of a primer, which, after it has been treated with water, yields a lacquer composition in accordance with the invention.

48 Claims, 3 Drawing Sheets

LACQUER COMPOSITION

BACKGROUND OF THE INVENTION

The invention relates to a lacquer composition, obtainable by a treatment of an organosilane compound with water, which organosilane compound comprises at least two hydrolytically-condensable silane substituents, as well as a non-hydrolyzable silane substituent which contains a hydroxy or hydrolyzable group bonded to a carbon atom. The invention also relates to a method of applying a coating of lacquer to a substrate, in particular parts of a shaver, such as a shaver head or a housing.

A lacquer composition of the type mentioned in the opening paragraph is known from a publication by K. Greiwe in Farbe+Lack, 97(11), 1991, pp. 968–971. The known lacquer composition is obtained by treating a mixture of 3-glycidyl-oxypropyltrimethoxysilane (abbr. GLYMO), an alkyl trimethoxysilane, and aluminum tri-sec-butylate with water and a solvent. The resultant lacquer composition is used, inter alia, in a method in which the lacquer composition is sprayed onto a brass surface and cured at 130° C. for 45 minutes. A disadvantage of the known lacquer composition is that it is prepared by means of aluminum tri-sec-butylate as the catalyst. This aluminum compound, which serves as a curing agent for the polymerization of the epoxy group present in GLYMO, has a limited shelf life under ambient conditions. If the curing agent has been in contact with air, the water present in the curing agent causes the effectiveness of the curing agent to be reduced, resulting in lacquer coatings of a non-uniform quality. Storage and handling should take place under water-free conditions, which, from a practical point of view, renders the processing unattractive. Although the aluminum compound plays an essential role in curing the lacquer coating, it has no important function in the cured lacquer coating. Besides, the reactivity of the aluminum compound is such that the treatment with water has to be carried out step by step, while cooling, which renders the preparation of the lacquer composition time-consuming and laborious. For example, the preparation of said lacquer composition on an industrial scale requires a computer-controlled system comprising a cooling unit and a double-walled reaction vessel, with the dosing rate of the starting substances having to be controlled by measuring the temperature of the reaction vessel.

It is known that the reactivity and the water-sensitivity of the aluminum compound can be slightly reduced by replacing a butylate ligand by an ethyl acetoacetate ligand. However, this measure proves to be insufficient to overcome the above-mentioned drawbacks.

SUMMARY OF THE INVENTION

It is an object of the invention to provide, inter alia, a lacquer composition which does not have the above-mentioned drawbacks. The invention particularly aims at providing a lacquer composition whose catalyst exhibits such insensitivity to water that storage and handling can take place in air without the properties of the lacquer composition being adversely affected. It should also be possible to prepare the lacquer composition in a simple manner, in a single step and in a short period of time without cooling, so that the preparation of the lacquer composition on an industrial scale can be carried out by means of a simple system. The invention further aims at providing a method of applying a lacquer coating to a substrate.

The object of the invention is achieved by a lacquer composition of the type mentioned in the opening paragraph, which is characterized, in accordance with the invention, in that the treatment with water takes place in the presence of a polycarboxylic acid, which is stable in contact with water.

By using a polycarboxylic acid as the catalyst, a lacquer composition is obtained whose catalyst exhibits a long shelf life under ambient conditions. Measures enabling storage and handling under water-free conditions can be dispensed with. In addition, the catalytic activity of the polycarboxylic acid proves to be such that the lacquer composition can be obtained by bringing all starting materials including the polycarboxylic acid in contact with each other, in a single step without cooling. By virtue thereof, the preparation of the lacquer composition on an industrial scale can be carried out in a simple manner without the necessity of a complicated, computer-controlled system and process. Moreover, the lacquer composition in accordance with the invention can be obtained in a short period of time. The preparation time typically amounts to approximately ten minutes.

The polycarboxylic acid does not only serve as a catalyst for the hydrolysis of the hydrolyzable substituents and groups, but also forms, in combination with the hydroxy or hydrolyzable group of the non-hydrolytically condensable silane substituent bonded to a carbon atom, an essential constituent of the lacquer coating obtained by curing the lacquer composition in accordance with the invention. If the carboxylic acid used is a polycarboxylic acid, then it becomes part of a network connection between crosslinks of the network due to the formation of ester groups from hydroxy groups and carboxy groups. An advantage of ester groups over other condensed groups, such as amides, is that esters are formed already at a low temperature of the order of 100° C.

The advantages offered by the lacquer composition in accordance with the invention only exist if the polycarboxylic acid is stable in contact with water, the protolysis of the carboxy groups of the polycarboxylic acid of course being left aside, as this reaction is reversible and does not have any influence on the stability of the carboxylic acid. In practice, this prerequisite hardly constitutes a limitation since carboxylic acids generally are stable in contact with water. However, this prerequisite does impose limitations if the carboxylic acid comprises other substituents which, in the presence of carboxy groups, are not stable in contact with water. Examples of such water-sensitive carboxylic acids, which, therefore, are not carboxylic acids in accordance with the invention, are disclosed in U.S. Pat. No. 5,036,145, formulas 5" and 5'".

The lacquer composition in accordance with the invention has excellent film-forming properties and, if necessary by adding diluting agents, is excellently sprayable to form lacquer coatings. The pot life of the lacquer composition is amply sufficient and typically amounts to approximately one day. In addition, said lacquer composition puts little pressure on the environment. Only emission of alcohols and water take place.

Lacquer coatings obtained by curing the lacquer composition in accordance with the invention prove to be wear-resistant and scratch-resistant, even in the case of prolonged exposure to solvents or compositions for personal care, such as shaving lotions. The lacquer coatings are transparent and meet high quality standards from an optical and esthetical point of view.

A cured lacquer coating comprises a network in which the network connections or the connections between crosslinks at some occasions of an organic and at other occasions of an inorganic character. Therefore, such a lacquer coating is also referred to as a hybrid or composite lacquer coating. Other designations are a lacquer coating obtained in accordance with a sol-gel process or a heteropolysiloxane.

Suitable polycarboxylic acids are, inter alia, maleic acid, fumaric acid, malonic acid, oxalic acid, adipic acid, tartaric acid, pyromellitic acid, terephthalic acid. Preferably, use is made of polycarboxylic acids which can be dissolved in an alcohol, such as maleic acid, oxalic acid, a benzene tricarboxylic acid and pyromellitic acid. If, in the preparation of the lacquer composition, an alcohol is liberated as a result of the hydrolysis operation, preference should be given to polycarboxylic acids which can be dissolved in this alcohol. Particularly suitable carboxylic acids are also soluble in water, such as maleic acid and oxalic acid. Preferably, use is made of maleic acid. If necessary, the polycarboxylic acid can be replaced by the corresponding anhydride, which, in contact with water and in the presence of an efficient catalytic quantity of an acid hydrolyzes to form the polycarboxylic acid.

Inter alia, an organosilane compound is used as the starting material for the lacquer composition. An organosilane compound is to be understood to mean a compound comprising a silicon atom to which an organosilane substituent is bonded. A silane substituent is hydrolyzable if a reaction of said silane substituent with water leads to the formation of a silanol group, Si—OH. The silane substituent is not only hydrolyzable but also hydrolytically condensable if an Si—O—Si bond is formed from a reaction of two silanol groups formed by hydrolysis, while eliminating water.

The organosilane compound comprises at least three reactive groups, whose reaction leads to the formation of a network when the lacquer composition is being cured. These reactive groups are the hydrolytically-condensable silane substituents and the carbon-atom bonded hydroxy or hydrolyzable group of the non-hydrolytically condensable silane-substituent, which groups can be esterified by the polycarboxylic acid. To make the hydroxy or hydrolyzable group bonded to a carbon atom contribute to the network formation, use has to be made of a polycarboxylic acid.

Suitable organosilane compounds are, for example, compounds in accordance with the formula $SiX_pY_qZ_r$, wherein X is a hydrolytically condensable silane substituent, Y is a non-hydrolytically condensable silane substituent comprising a hydroxy or hydrolyzable group bonded to a carbon atom, and Z is a non-reactive silane substituent and p is equal to 2 or 3, q is equal to 1 or 2, r is equal to 0 or 1 and p+q+r is equal to 4. Each time X, Y or Z occurs, it is possible, of course, to choose another silane substituent.

Suitable hydrolytically condensable silane substituents, such as X in the above-mentioned formula, are selected, for example, from the group formed by halogen, hydroxy, alkoxy, acyloxy or amino, or, preferably, methoxy, ethoxy.

Suitable non-reactive silane substituents, such as Z in the above-mentioned formula, are silane substituents which are not hydrolytically condensable and do not comprise reactive groups. Examples of said non-reactive silane substituents are silane substituents which are bonded to the silicon atom by means of an Si—C bond, such as alkyl or aryl, or preferably methyl or phenyl.

Suitable silane substituents which are not hydrolytically condensable and which comprise a hydroxy group bonded to a carbon atom, such as Y in the above-mentioned formula, are, for example, alkyl substituents or aryl substituents in which at least one hydrogen atom is replaced by a hydroxy group. Use can also suitably be made of alkyl substituents or aryl substituents in which a number of hydrogen atoms is replaced by a hydrolyzable group. It is possible, yet not preferable, to use a mercapto group instead of a hydroxy group. An example of a hydrolyzable group is an ester or a thioester, but preferably use is made of an epoxy group, in which case the organosilane compound is an epoxysilane. In the presence of an acid as the catalyst, epoxy groups hydrolyze into vicinal diols. Suitable epoxysilanes are a glycidyloxyalkyltrialkoxysilane or a (3,4-epoxycyclohexyl)alkyltrialkoxysilane. A very suitable epoxysilane is 3-glycidyloxypropyltrimethoxysilane. If, in this case after hydrolysis, the silane substituent Y comprises two hydroxy groups, linear organic polymeric chains can be distinguished as the network connection in the lacquer coating obtained after curing, while three hydroxy groups may give rise to an organic network serving as the network connection.

A preferred embodiment in accordance with the invention is characterized in that at the beginning of the treatment the pH-value is chosen to range between 0 and 4. By choosing the pH-value to be smaller than 4 at the beginning of the treatment, that is, immediately after the starting materials of the lacquer composition have been combined, the lacquer composition can be prepared in a very short period of time as the rate of hydrolysis increases as the pH-value decreases. If an epoxysilane is used, a pH-value of 4 is small enough to hydrolyze the epoxy group into a diol. However, if the pH-value is smaller than 0, the pot life of the lacquer composition is reduced. Preferably, the pH-value is approximately 2. The use of the polycarboxylic acid as the starting material enables the pH to be brought to a suitable value at the beginning of the treatment. If necessary, the pH-value can be reduced by adding other acids.

Another preferred embodiment in accordance with the invention is characterized in that, at the beginning of the treatment, the molar ratio between the number of, whether or not latent, hydroxy groups of the non-hydrolytically condensable silane substituent and the number of carboxy groups of the polycarboxylic acid ranges between 1 and 10. The polycarboxylic acid does not only serve as a catalyst for the hydrolysis but is also incorporated in the network obtained after curing of the lacquer composition. To this end, the polycarboxylic acid is present in a stoichiometric quantity, i.e. a non-catalytic quantity. Since the carboxy groups of the polycarboxylic acid react with the hydroxy groups bonded to a carbon atom to form ester groups, the molar ratio between the carboxy groups and the hydroxy groups is relevant. If a hydrolyzable group bonded to a carbon atom is used, then the hydroxy groups are latently present at the beginning of the treatment, that is, the hydroxy groups are not present until after hydrolysis. For example, an epoxy group comprises two latent hydroxy groups. By varying the quantity of polycarboxylic acid, while the degree of acidity remains constant, it was established that the number of hydroxy groups bonded to a carbon, expressed in moles, preferably exceeds the number of carboxy groups of the polycarboxylic acid. If the molar ratio is below 1, the lacquer coating obtained after curing of the lacquer composition adheres insufficiently to substrates of polyamides. A molar ratio above 10 leads, after curing, to a lacquer coating comprising an insufficiently coherent network. Preferably, the molar ratio is approximately 4.

To prepare the lacquer composition, use is made of a stoichiometric quantity of water. To bring about a proper wettability, preferably, the quantity of water used is minimized. However, the quantity of water should be sufficient to hydrolyze the hydrolyzable groups.

The sequence in which the starting materials are combined to prepare the lacquer composition is not essential. For example, if the carboxylic acid is water-soluble, it can be dissolved in water, whereafter this solution is added to the organosilane compound.

The treatment of the organosilane compound with water is preferably carried out in the presence of starting substances and materials other than the polycarboxylic acid, in order to influence the properties of the cured lacquer coating. For example, the appearance of the cured lacquer coating can be influenced by using dyes, (aluminum) pigments or light-scattering particles. By adding conductive particles, such as soot or an indium-tin oxide, an anti-static lacquer coating which shields from electromagnetic fields can be produced.

The properties of the network of the cured lacquer coating can be influenced by adding a second hydrolytically condensable compound, such as an alkoxide of zirconium, aluminum or titanium. Preferably, however, a second hydrolytically condensable organosilane compound is used. For example, the mechanical strength of the cured lacquer layer can be further improved by using a tetra-alkoxysilane, such as tetra-alkylorthosilicate (TEOS). However, the risk of crack-formation during curing of the lacquer composition increases as the quantity of TEOS added increases. The risk of crack-formation can be reduced, while preserving the mechanical strength, by using, for the starting substance, a suspension of nano-particles of silica which replace a part of the TEOS added.

The object of providing a method of applying a lacquer coating to a substrate is achieved by a method in which a lacquer composition is applied to the substrate and cured, thereby forming the lacquer coating, said method being characterized in accordance with the invention in that a lacquer composition in accordance with the invention is used.

The lacquer composition can be provided by means of methods which are known per se, such as spin-coating, curtain-coating or dip-coating. Preferably, the lacquer composition is applied by spraying. The applied lacquer composition can be cured by means of heating. The appropriate temperature and the duration of the thermal treatment are governed by the lacquer composition used and can be determined in a simple manner, for example, by measuring the hardness of the lacquer coating. In general, the hardness and the adhesion are better as the temperature employed is higher. To preclude yellowing of the lacquer coating, the temperature should be below 200° C. At a temperature above 100° C., water is removed from the lacquer coating being formed, which has a positive effect on the condensation reactions and hence on the curing of the lacquer coating. Preferably, the temperature is selected in the range between 110° C. and 180° C. However, the nature of the substrate may require a lower temperature. For example, if a substrate of an acrylonitrile butadiene styrene is used, the curing temperature is preferably maximally 80° C.

The method and the lacquer composition are suitable for substrates which are made, for example, of metal, glass or synthetic resin. It has been found that lacquer coatings obtained by means of the method in accordance with the invention adhere excellently to substrates of a polar synthetic resin, such as a polyamide. The adhesion to less polar synthetic resins, such as a polycarbonate, can be improved by subjecting the polycarbonate substrate surface, prior to the application of the lacquer composition, to a treatment with a primer so as to form a bonding layer. An amino-organosilane compound, such as 3-aminopropyltrimethoxysilane proves to be a suitable primer.

An improvement of the adhesion of the lacquer coating to apolar synthetic resins, such as a polystyrene, a polyether or, in particular, an acrylonitrile butadiene styrene (ABS), can be achieved by means of a preferred embodiment of the method in accordance with the invention, which is characterized in that prior to the application of the lacquer composition, a mixture comprising an epoxysilane and a polycarboxylic acid is provided on the substrate.

It has been found that, unlike a hydrolyzed epoxysilane, a non-hydrolyzed epoxysilane proves to strongly attack or leads to a strong softening of the surface of a substrate of an apolar synthetic resin, such as ABS. As a result of this attacking or etching effect, the mixture is fixed in the substrate surface. By treating the resultant substrate surface with water, the quantity of water present in the atmosphere already being sufficient as the mixture is provided in a very small layer thickness, a thin layer of a lacquer composition in accordance with the invention is formed on the substrate surface. Subsequently, a lacquer composition in accordance with the invention is provided thereon and the whole is cured in a customary manner. The resultant lacquer coating adheres well to the substrate of the apolar synthetic resin. Suitable epoxysilanes and polycarboxylic acids have been mentioned hereinabove. Preferably, the mixture also comprises a solvent which enhances the attack of the substrate. A suitable solvent for ABS is, for example, methylethylketone.

The fixation of the mixture in the substrate surface can be improved by heating the substrate for several minutes after the mixture has been provided on the substrate. Infrared-spectroscopic measurements reveal that, at a heating temperature of 70° C. to 80° C. or higher, the polycarboxylic acid reacts with the epoxy group of the epoxysilane, thereby forming ester groups, which leads to an improved fixation. Experiments have further shown that, although the molar ratio between the epoxysilane and the polycarboxylic acid is not critical per se, the best results are achieved at a molar ratio of approximately 2.

The mixture, which comprises an epoxysilane and a polycarboxylic acid, is used as a primer for a lacquer composition in accordance with the invention. The primer is activated by water. Thus, the activated primer is actually a lacquer composition in accordance with the invention. By using this primer, the apolar surface of a synthetic resin, such as ABS, is converted to a polar surface. It may be assumed that this results in an improvement of the adhesion and/or wettability for each polar lacquer composition, such as a water-containing or sol-gel based lacquer composition, which is to be provided on an apolar substrate.

The lacquer composition can very suitably be applied to a great variety of products, such as display screens, housings for television receivers and other electrical products, personal-care products, such as shavers, domestic appliances and luminaires. As the attractive properties of the lacquer coating are not adversely affected by prolonged (exposure to compositions for personal care, such as shaving lotions, the lacquer coating in accordance with the invention can be very advantageously applied to parts of electric shavers, such as the shaver head or a housing.

These and other aspects of the invention will be apparent from and elucidated with reference to the embodiments described hereinafter.

EXAMPLE 1

A quantity of 150 g of the organosilane compound GLYMO, 520 g TEOS, 225 g water and 18 g of a polycarboxylic acid, i.e. maleic acid, are introduced into a reaction vessel at room temperature. These starting substances, which initially do not mix with each other, are intensively stirred, in which process to some extent heat generation is observed. After approximately ten minutes, a lacquer composition in accordance with the invention is obtained. Said lacquer composition is clear, transparent, with a pot life of at least one day and can be sprayed in a conventional lacquering line.

The lacquer composition is subsequently applied to a substrate by immersing a substrate of a glass-filled polyamide (tradename Durethane, supplier Bayer) in the lacquer composition and, subsequently, curing it for 20 minutes at 160° C., thereby forming the lacquer coating. The layer thickness of the lacquer coating is 15 micrometers.

The lacquer coating is subsequently subjected to the following resistance tests:
a salt-water spray test in accordance with DIN 53167// IEC68-2-11, an artificial perspiration test in accordance with DIN 53 160, and immersion in boiling water for half an hour; the lacquer coating passed said tests successfully.

DETAILED DESCRIPTION OF THE PREFERRED EMBODIMENTS

The adhesion of the lacquer to the substrate is tested by means of a cross-cut (Gitterschnitt) test in accordance with DIN 53 151, the outcome being that not a single part of the lacquer coating is removed from the substrate.

The resistance to wear is examined by bringing the lacquer coating into contact with a rotating disc-shaped abrasive sponge (Scotch Brite), 10 cm across, with a compressive force of 250 g. After 500 revolutions, no signs of wear are observed, not even after the lacquer coating has first been exposed for 48 hours to an alcoholic solution of emollients comprising 5 to 10% by weight of diisopropyladipate, 10 to 20% by weight of isopropyl myristate and 0 to 10% by weight of PEG 40 hydrogenated Castor oil.

The resistance to climatologic conditions is tested by means of a Cyclic damp heat test in accordance with IEC68-2-30, temperature cycling test in accordance with IEC68-2-14 and dry-heat test in accordance with IEC68-2-2; the lacquer coating passed said tests without being attacked.

The hardness of the lacquer coating is excellent: an Erichson scratch tester which is set to the highest compressive force, i.e. 20 N, and provided with a scratch disc of synthetic resin, copper or stainless steel does not leave any scratches on the surface of the lacquer coating.

Similar results are achieved with a lacquer composition of 300 g GLYMO, 1050 g TEOS, 36 g maleic acid and 450 g water.

EXAMPLE 2

A quantity of 300 g GLYMO, 1040 g TEOS, 36 g maleic acid and 450 g water are introduced into a reaction vessel at room temperature and stirred intensively for approximately ten minutes, whereafter a lacquer composition in accordance with the invention is obtained. Subsequently, a substrate of polycarbonate (Makrolon, Bayer) is treated with the primer 3-aminopropyltrimethoxysilane by dip-coating the substrate in a 3% by weight solution of the primer in alcohol. A lacquer composition is provided on the substrate thus treated by means of dip-coating and cured at 130° C. for 20 minutes.

The resultant lacquer coating is subjected to the tests described in example 1, the test results being similar to those of example 1.

EXAMPLE 3

A quantity of 3.0 g GLYMO, 10.4 g TEOS, 0.6 g of the polycarboxylic acid 1,2,4,5-pyromellitic acid, and 4.5 g water are introduced into a reaction vessel of a suitable volume at room temperature and stirred intensively for approximately ten minutes, whereafter a lacquer composition in accordance with the invention is obtained. The clear lacquer composition is provided on a substrate of a glass-filled polyamide (Durethane, Bayer) and cured at 160° C. for 20 minutes.

The resultant lacquer coating is subjected to the tests described in example 1, the results being similar to those of example 1.

EXAMPLE 4

A quantity of 500 g GLYMO, 210 g TEOS, 60 g maleic acid and 1000 g ethanol are introduced into a reaction vessel of a suitable volume at room temperature. Subsequently, 1130 g of an aqueous suspension of silica particles (Ludox TM50, Dupont de Nernours) are added and the whole is stirred for 10 minutes, which results in the formation of a lacquer composition in accordance with the invention. Next, the lacquer composition is sprayed onto a substrate of polyamide (Durethane, Bayer) and cured at 160° C. for 20 minutes, thereby forming a hard, wear-resistant lacquer coating which does not show any cranking. The layer thickness of the lacquer coating is 20 micrometers. From the quantities used, it is calculated that the lacquer coating contains 65% by weight $SiO_2$. For comparison, lacquer coatings obtained from the lacquer compositions of example 1 have an $SiO_2$-content of 50% by weight and do not exhibit cracks. If TEOS is added to the lacquer composition of example 1 in such a quantity that the lacquer coatings formed from said composition contain 65 wt. % $SiO_2$, then these lacquer coatings do exhibit crack formation.

EXAMPLE 5

A primer comprising a mixture of 10.0 g GLYMO, 2.5 g maleic acid in 100 g methylethylketone is sprayed onto a substrate of a polyphenylene oxide (Noryl 731 S, General Electric). The resultant substrate is heated at 80° C. for 3 minutes. Subsequently, the lacquer composition, which is obtained by intensively stirring 22.5 g GLYMO, 2.7 g maleic acid, 19.5 g TEOS in 45 g alcohol with 51 g Ludox TM50, for 10 minutes, is sprayed onto said substrate and cured at 160° C. for 20 minutes, thereby forming a lacquer coating.

The lacquer coating is subjected to the series of resistance tests described in example 1, and it passed these tests successively.

EXAMPLE 6

A primer composed of a mixture of 10.0 g GLYMO and 2.50 g maleic acid in 100 g methylethylketone is sprayed onto a substrate of ABS (Cycolac, General Electric) and, subsequently, heated at 80° C. for 3 minutes. Next, the lacquer composition, which is obtained by intensively stirring 300 g GLYMO, 520 g TEOS, 36 g maleic acid and 650 g methylethylketone with 540 g Ludox TM50 for 10 minutes, is sprayed onto said substrate and cured at 80° C. for 20 minutes, thereby forming a hard, wear-resistant lacquer coating.

Said lacquer coating exhibits an excellent adhesion, as determined by a cross-cut test in accordance with DIN 53 160. The lacquer coating also passes this test if it has been previously exposed for 48 hours to the solution of emollients described in example 1. For comparison, an ABS substrate which is provided with a similar lacquer coating, but without the primer in accordance with the invention, can be removed in a simple manner by means of adhesive tape.

EXAMPLE 7

Figure 1:
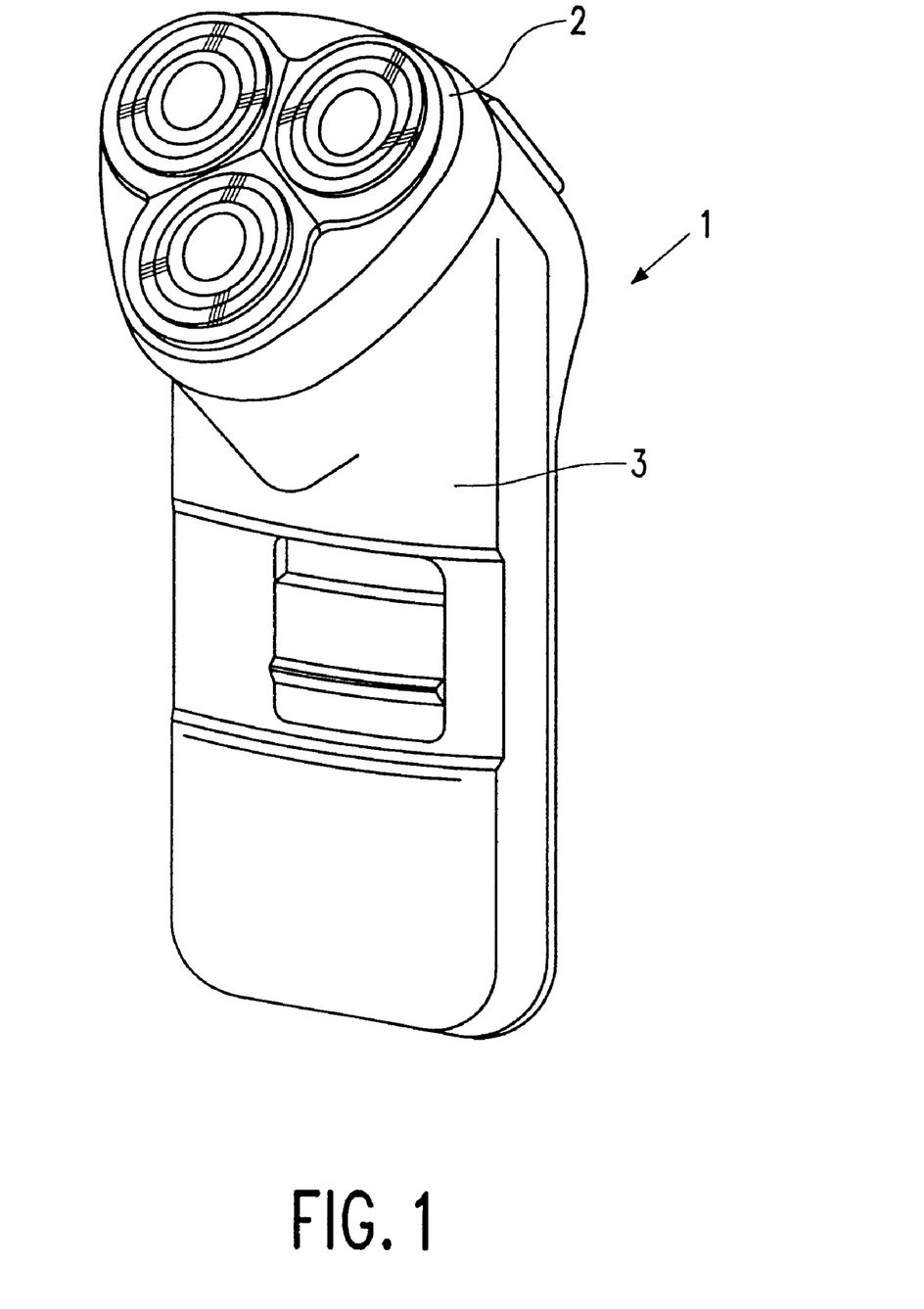
FIG. 1 shows an electric rotary shaving apparatus whose shaving head and housing are provided with a lacquer coating obtained by using the method in accordance with the invention.

FIG. 1 shows an electric shaver 1 whose shaver head 2 and housing 3 are provided with a lacquer coating obtained by means of the method in accordance with the invention. The shaver head 2 is provided with a protective coating by using, in example 4, the shaver head as the substrate. The housing 3 is provided with a lacquer coating by using, in example 6, the housing 3 as the substrate.

EXAMPLE 8

Figure 2:
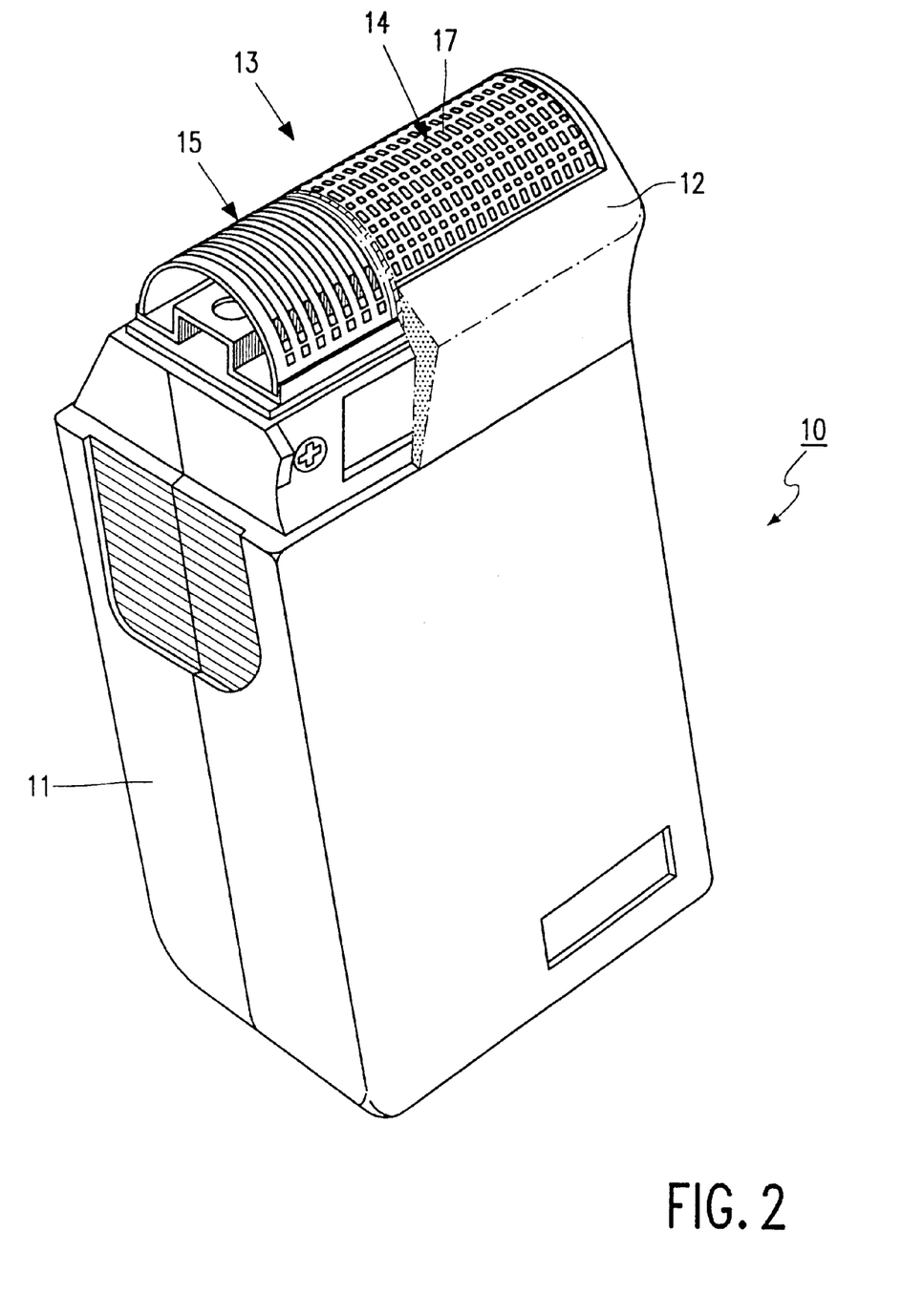
FIG. 2 shows an electric vibratory shaving apparatus.
Figure 3:
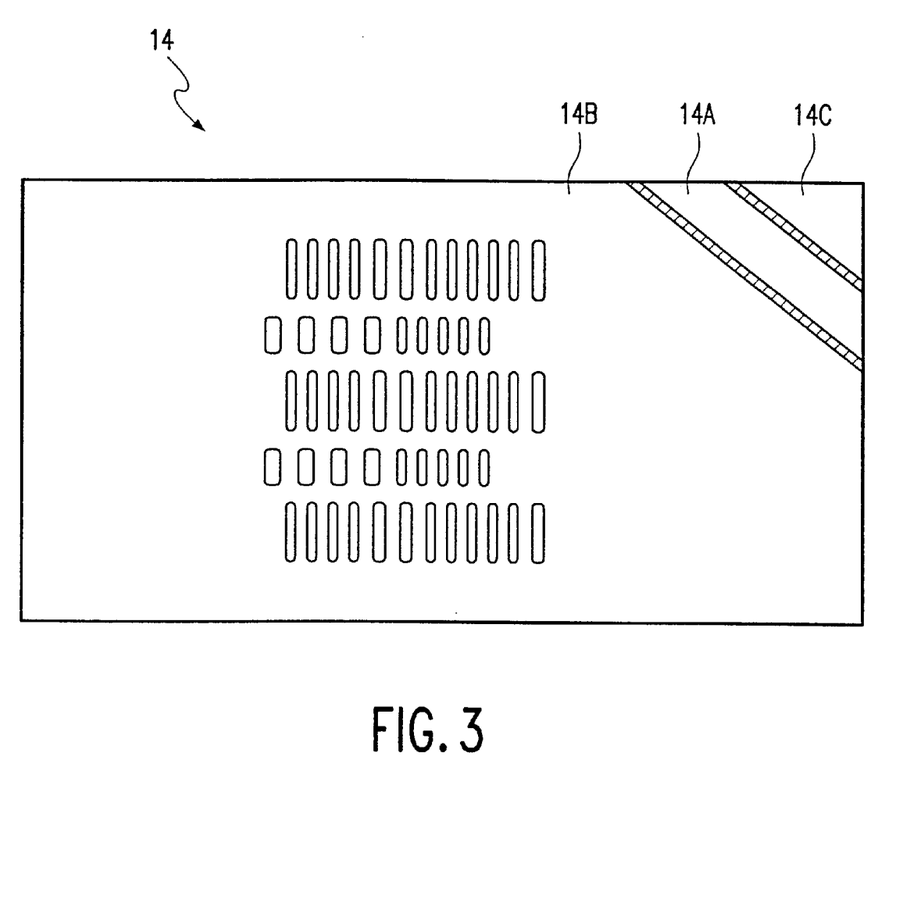
FIG. 3 shows a partial cut-away view of an external cutting member of the apparatus of FIG. 2.

FIG. 2 shows an electric vibratory shaving apparatus 10 comprising a housing 11, a shaving head 12, and a cutting unit 13 having an external cutting member 14 and an internal cutting member 15. The external cutting member 14 comprises an arcuate metal foil having a multitude of hair-entry apertures 17. The internal cutting member 15 reciprocates underneath and cooperates with the foil. FIG. 3 shows a cut-away view of such a foil. The foil comprises a stainless steel substrate 14A which on the side facing the internal member 15 is provided with a coating 14B and on the side facing away thereof with a coating 14C. Both the coatings 14B and 14C are lacquer coatings obtained using the method in accordance with the invention as exemplified in Example 1. If desired, either the coating 14B or 14C may be left out.

By way of example, the foil is manufactured as follows:

A reactor vessel is filled with 72 g GLYMO, 125 g TEOS, 8.6 g maleic acid and 150 g ethanol. Then 126 g Ludox TM-S0 is added and the resulting composition stirred for 10 min thus obtaining a lacquer composition in accordance with the invention. The lacquer composition is by means of spray-coating applied to both sides of a stainless-steel foil 14A and cured at 160° C. for 20 min resulting in the coatings 14B and 14C which have a Thickness of 10 μm. The coatings 14B and 14C are resistant to wear and compositions for personal care such as shaving lotions as demonstrated by the fact that they pass the tests described in example 1. Also, said coatings are sufficiently flexible so as to be bendable into the arcuate shape required for use in said vibratory shaving apparatus. Also, the coating 14C reduces the friction between the skin and the external cutting member 14 whereas the coating 14B reduces the friction between the external and internal cutting member and, possibly, provides a sharper cutting edge.

Although in this example the foil has a coating in accordance with the invention, said coating may be suitably used on other parts of the shaving apparatus such as the internal cutting member.

What is claimed is:

1. A lacquer composition which comprises the product of a treatment of a mixture of an organosilane compound with water in the presence of a substance which functions as a catalyst and as a crosslinking agent, which organosilane compound comprises at least two hydrolytically-condensable silane substituents, and at least one non-hydrolytically-condensable silane substituent which contains a hydroxy or hydrolyzable group bonded to a carbon atom, said substance reacting with at least one said non-hydrolytically condensable silane substituent to form an ester group, and being selected from the group consisting of (i) a polycarboxylic acid which is stable in contact with water and (ii) an anhydride which hydrolyzes to form said polycaboxylic acid, with the proviso that when said at least one non-hydrolytically condensable silane substituent is an epoxy group, at the beginning of the treatment, the mixture has a pH in the range of 0 to 4.

2. A lacquer composition as claimed in claim 1, wherein the polycarboxylic acid is soluble in water.

3. A lacquer composition as claimed in claim 2, wherein the polycarboxylic acid is maleic acid.

4. A lacquer composition as claimed in claim 1, wherein the organosilane compound is an epoxysilane.

5. A lacquer composition as claimed in claim 4, wherein the epoxysilane is 3-glycidyloxypropyltrimethoxysilane.

6. A lacquer composition as claimed in claim 1, wherein at the beginning of the treatment, the molar ratio between the number of hydroxy groups of the non-hydrolytically condensable silane substituent and the number of carboxy groups of the polycarboxylic acid ranges between 1 and 10.

7. A lacquer composition as claimed in claim 6, wherein the molar ratio is approximately 4.

8. A lacquer composition as claimed in claim 1, wherein the treatment takes place in the presence of a second hydrolytically condensable organosilane compound.

9. A lacquer composition as claimed in claim 8, wherein the second hydrolytically condensable organosilane compound is a tetra-alkoxysilane.

10. A lacquer composition as claimed in claim 1, wherein the treatment takes place in the presence of a suspension of silica particles.

11. A lacquer composition as claimed in claim 1, wherein the polycarboxylic acid is maleic acid.

12. A method of applying a lacquer coating to a substrate in which method a lacquer composition is applied to the substrate and cured, thereby forming the lacquer coating, characterized in that a lacquer composition as claimed in claim 1 is used.

13. A method as claimed in claim 12, characterized in that prior to the application of the lacquer composition, a mixture comprising an epoxysilane and a polycarboxylic acid is provided on the substrate.

14. A shaver head provided with a protective coating, characterized in that the protective coating is obtained by using the method as claimed in claim 12.

15. An electric shaver comprising a housing provided with a lacquer coating, characterized in that the lacquer coating is obtained by using the method as claimed in claim 12.

16. A lacquer composition which comprises the product of a treatment of a mixture of an organosilane compound with water in the presence of a substance which functions as a catalyst and as a crosslinking agent, which organosilane compound comprises at least two hydrolytically-condensable silane substituents, and at least one non-hydrolytically condensable silane substituent which contains a hydroxy or hydrolyzable group bonded to a carbon atom, said substance reacting with at least one said non-hydrolytically condensable silane substituent to form an ester group, and being selected from the group consisting of (i) a polycarboxylic acid selected from the group consisting of maleic acid, fumaric acid, malonic acid, oxalic acid, adipic acid, tartaric acid, terephthalic acid, a benzene tricarboxylic acid and pyromellitic acid; and (ii) an anhydride which hydrolyzes to form said polycaboxylic acid with the proviso that when said at least one non-hydrolytically condensable silane substituent is an epoxy group, at the beginning of the treatment, the mixture has a pH in the range of 0 to 4.

17. A lacquer composition which comprises the product of a treatment of a mixture of an organosilane compound with water in the presence of a catalyst, which organosilane compound is selected from compounds having the formula:

wherein X is a hydrolytically condensable silane substituent, Y is a non-hydrolytically condensable silane substituent comprising a hydroxy or hydrolyzable group bonded to a carbon atom, and Z is a non-reactive silane substituent having a Si—C bond; p is equal to 2 or 3, q is equal to 1 or 2, r is equal to 0 or 1 and p+q+r is equal to 4;

said catalyst reacting with at least one Y substituent to form an ester group, and being selected from the group consisting of (i) a polycarboxylic acid; and (ii) an anhydride which hydrolyzes to form said polycaboxylic acid, with the proviso that when said at least one non-hydrolytically condensable silane substituent is an epoxy group, at the beginning of the treatment, the mixture has a pH in the range of 0 to 4.

18. A lacquer composition which comprises the product of a treatment of a mixture of an organosilane compound with water in the presence of a catalyst, which organosilane compound is selected from compounds having the formula wherein X is a hydrolytically condensable silane substituent selected from the group consisting of halogen, hydroxy, alkoxy, acyloxy and amino; Y is a non-hydrolytically condensable silane substituent comprising a hydroxy or hydrolyzable group bonded to a carbon atom selected from the group consisting of alkyl and aryl groups in which at least one hydrogen atom is replaced by a hydroxy, mercapto, or ester, thioester, or epoxy hydrolyzable group; and Z is a non-reactive silane substituent selected from the group consisting of alkyl or aryl groups bonded to the silicon atom by a Si-C bond;

said catalyst reacting with at least one Y substituent to form an ester group, and being selected from the group consisting of (i) a polycarboxylic acid; and (ii) an anhydride which hydrolyzes to form said polycaboxylic acid, with the proviso that when Z is an epoxy hydrolyzable group, at the beginning of the treatment, the mixture has a pH in the range of 0 to 4.

19. A lacquer composition having a pot life of at least one day which comprises the product of a treatment of a mixture of 3-glycidyl-oxypropyltrimethoxysilane and tetra-alkylorthosilicate with water in the presence of a catalyst which is stable in contact with water, said catalyst reacting with at least one hydroxyl group of a vicinal diol that results from the hydrolysis of said 3-glycidyl-oxypropyltrimethoxysilane in the presence of said catalyst to form an ester group, said catalyst being selected from the group of maleic acid and pyromellitic acid, with the proviso that at the beginning of the treatment, the mixture has a pH in the range of 0 to 4.

20. A lacquer composition which comprises the product of a treatment of a mixture consisting essentially of an organosilane compound, which comprises at least two hydrolytically-condensable silane substituents, and at least one non-hydrolytically condensable silane substituent which contains a hydroxy or hydrolysable group bonded to a carbon atom, with water in the presence of a substance which functions as the catalyst for the hydrolysis of hydrolysable substituents and groups present in the mixture and as a crosslinking agent, said substance reacting with at least one said non-hydrolytically condensable silane substituent to form an ester group, and being selected from the group consisting of (i) a polycarboxylic acid which is stable in contact with water and (ii) an anhydride which hydrolyzes to form said polycarboxylic acid, with the proviso that when said at least one non-hydrolytically condensable silane substituent is an epoxy group, at the beginning of the treatment, the mixture has a pH in the range of 0 to 4.

21. A lacquer composition which comprises the product of a treatment of a mixture consisting essentially of an organosilane compound, which comprises at least two hydrolytically-condensable silane substituents, and at least one non-hydrolytically condensable silane substituent which contains a hydroxy or hydrolysable group bonded to a carbon atom, with water in the presence of a substance which functions as the catalyst for the hydrolysis of hydrolysable substituents and groups present in the mixture and as a crosslinking agent, said substance reacting with at least one said non-hydrolytically condensable silane substituent to form an ester group, and being selected from the group consisting of maleic acid, fumaric acid, malonic acid, oxalic acid, adipic acid, tartaric acid, terephthalic acid, a benzene tricarboxylic acid and pyromellitic acid; and (ii) an anhydride which hydrolyzes to form said polycarboxylic acid;

with the proviso that when said at least one non-hydrolytically condensable silane substituent is an epoxy groups, at the beginning of the treatment, the mixture has a pH in the range of 0 to 4.

22. A lacquer composition which comprises the product of a treatment of a mixture consisting essentially of at least one organosilane compound, which comprises at least two hydrolytically-condensable silane substituents, and at least one non-hydrolytically condensable silane substituents which contains a hydroxy or hydrolysable group bonded to a carbon atom, and mixtures thereof with at least one additional hydrolytically condensable organosilane, with water in the presence of a substance which functions as the catalyst for the hydrolysis of hydrolysable substituents an and groups present in the mixture and as a crosslinking agent, said substance reacting with at least one said non-hydrolytically condensable silane substituent to form an ester group, and being selected from the group consisting of (i) a polycarboxylic acid which is stable in contact with water and (ii) an anhydride which hydrolyzes to form said polycarboxylic acid, with the proviso that when said at least one non-hydrolytically condensable silane substituent is an epoxy group, at the beginning of the treatment, the mixture has a pH in the range of 0 to 4.

23. A lacquer composition which comprises the product of a treatment of a mixture consisting essentially of at least one organosilane compound, which comprises at least two hydrolytically-condensable silane substituents, and at least one non-hydrolytically condensable silane substituent which contains a hydroxy or hydrolysable group bonded to a carbon atom, and mixtures thereof with at least one additional hydrolytically condensable organosilane, with water in the presence of a substance which functions as the catalyst for the hydrolysis of hydrolysable substituents and groups present in the mixture and as a crosslinking agent, said substance reacting with at least one said non-hydrolytically condensable silane substituent to form an ester group, and being selected from the group consisting of maleic acid, fumaric acid, malonic acid, oxalic acid, adipic acid tartaric acid, terephthalic acid, a benzene tricarboxylic acid and pyromellitic acid; and (ii) an anhydride which hydrolyzes to form said polycarboxylic acid, with the proviso that when said at least one non-hydrolytically condensable silane substituent is an epoxy group, at the beginning of the treatment, the mixture has a pH in the range of 0 to 4.

24. A lacquer composition of improved stability which comprises the product of a treatment of a mixture consisting essentially of 3-glycidyl-oxypropyltrimethoxysilane and tetra-alkylorthosilicate with water in the presence of a catalyst which is stable in contact with water, said catalyst reacting with at least one hydroxyl group of a vicinal diol that results from the hydrolysis of said 3-glycidyl-oxypropyltrimethoxysilane in the presence of said catalyst to form an ester group, said catalyst being selected from the group consisting of (i) a polycarboxylic acid which is stable in contact with water and (ii) an anhydride which hydrolyzes to form said polycarboxylic acid, with the proviso that at the beginning of the treatment, the mixture has a pH in the range of 0 to 4.

25. A lacquer composition which comprises the product of a treatment of a mixture of an organosilane compound with water in the presence of a substance which functions as a catalyst and as a crosslinking agent, which organosilane compound comprises at least two hydrolytically-condensable silane substituents, and at least one non-hydrolytically condensable silane substituent which contains a hydroxy or hydrolyzable group bonded to a carbon atom, said substance reacting with at least one said non-hydrolytically condensable silane substituent to form an ester group, and being selected from the group consisting of (i) a polycarboxylic acid which is stable in contact with water and (ii) an anhydride which hydrolyzes to form said polycarboxylic acid, with the proviso that when said at least one non-hydrolytically condensable silane substituent is an epoxy group, at the beginning of the treatment, the mixture has a pH less than or equal to 4.

26. A lacquer composition as claimed in claim 25, wherein the polycarboxylic acid is soluble in water.

27. A lacquer composition as claimed in claim 26, wherein the polycarboxylic acid is soluble in water.

28. A lacquer composition as claimed in claim 25, wherein the organosilane compound is an epoxysilane.

29. A lacquer composition as claimed in claim 28, wherein the epoxysilane is 3-glycidyloxypropyltrimethoxysilane.

30. A lacquer composition as claimed in claim 25, wherein at the beginning of the treatment, the molar ratio between the number of hydroxy groups of the non-hydrolytically condensable silane substituent and the number of carboxy groups of the polycarboxylic acid ranges between 1 and 10.

31. A lacquer composition as claimed in claim 30, wherein the molar ratio is approximately 4.

32. A lacquer composition as claimed in claim 25, wherein the treatment takes place in the presence of a second hydrolytically condensable organosilane compound.

33. A lacquer composition as claimed in claim 32, wherein the second hydrolytically condensable organosilane compound is a tetra-alkoxysilane.

34. A lacquer composition as claimed in claim 25, wherein the treatment takes place in the presence of a suspension of silica particles.

35. A lacquer composition as claimed in claim 25, wherein the polycarboxylic acid is maleic acid.

36. A method of applying a lacquer coating to a substrate in which method a lacquer composition is applied to the substrate and cured, thereby forming the lacquer coating, characterized in that a lacquer composition as claimed in claim 25.

37. A method as claimed in claim 36, characterized in that prior to the application of the lacquer composition, a mixture comprising an epoxysilane and a polycarboxylic acid is provided on the substrate.

38. A shaver head provided with a protective coating, characterized in that the protective coating is obtained by using the method as claimed in claim 36.

39. An electric shaver comprising a housing provided with a lacquer coating, characterized in that the lacquer coating is obtained by using the method as claimed in claim 36.

40. A lacquer composition which comprises the product of a treatment of a mixture of an organosilane compound with water in the presence of a substance which functions as a catalyst and as a crosslinking agent, which organosilane compound comprises at least two hydrolytically-condensable silane substituents, and at least one non-hydrolytically condensable silane substituent which contains a hydroxy or hydrolysable group bonded to a carbon atom, said substance reacting with at least one said non-hydrolytically condensable silane substituent to form an ester group, and being selected from the group consisting of (i) a polycarboxylic acid selected from the group consisting of maleic acid, fumaric acid, malonic acid, oxalic acid, adipic acid, tartaric acid, terephthalic acid, a benzene tricarboxylic acid and pyromellitic acid; and (ii) an anhydride which hydrolyzes to form said polycarboxylic acid, with the proviso that when said at least one non-hydrolytically condensable silane substituent is an epoxy group, at the beginning of the treatment, the mixture has a pH of less than or equal to 4.

41. A lacquer composition which comprises the product of a treatment of a mixture of an organosilane compound with water in the presence of a catalyst, which organosilane compound is selected from compounds having the formula wherein X is a hydrolytically condensable silane substituent, Y is a non-hydrolytically condensable silane substituent comprising a hydroxy or hydrolysable group bonded to a carbon atom, and Z is a non-reactive silane substituent having a Si-C bond; p is equal to 2 or 3, q is equal to 1 to 2, r is equal to 0 or 1 and p+q+r is equal to 4;

said catalyst reacting with at least one Y substituent to form an ester group, and being selected from the group consisting of (i) a polycarboxylic acid; and (ii) an anhydride which hydrolyzes to form said polycarboxylic acid, with the proviso that when said at least one non-hydrolytically condensable silane substituent is an epoxy group, at the beginning of the treatment, the mixture has a pH of less than or equal to 4.

42. A lacquer composition which comprises the product of a treatment of a mixture of an organosilane compound with water in the presence of a catalyst, which organosilane compound is selected from compounds having the formula $$SiX_pY_qZ_r$$

wherein

X is a hydrolytically condensable silane substituent selected from the group consisting of halogen, hydroxy, alkoxy, acyloxy and amino; Y is a non-hydrolytically condensable silane substituent comprising a hydroxy or hydrolysable group bonded to a carbon atom selected from the group consisting of alkyl and aryl groups in which at least one hydrogen atom is replaced by a hydroxy, mercapto, or ester, thioester, or epoxy hydrolysable group; and Z is a non-reactive silane substituent selected from the group consisting of alkyl or aryl groups bonded to the silicon atom by a Si-C bond;

said catalyst reacting with at least one Y substituent to form an ester group, and being selected from the group consisting of (i) a polycarboxylic acid; and (ii) an anhydride which hydrolyzes to form said polycarboxylic acid, with the proviso that when Z is an epoxy hydrolysable group, at the beginning of the treatment, the mixture has a pH of less than or equal to 4.

43. A lacquer composition having a pot life of at least one day which comprises the product of a treatment of a mixture of 3-glycidyl-oxypropyltrimethoxysilane and tetraalkylorthosilicate with water in the presence of a catalyst which is stable in contact with water, said catalyst reacting with at least one hydroxyl group of a vicinal diol that results from the hydrolysis of said 3-glycidyl-oxypropyltrimethoxysilane in the presence of said catalyst to form an ester group, said catalyst being selected from the group of maleic acid and pyromellitic acid, with the proviso that at the beginning of the treatment, the mixture has a pH of less than or equal to 4.

44. A lacquer composition which comprises the product of a treatment of a mixture consisting essentially of an organosilane compound, which comprises at least two hydrolytically-condensable silane substituents, and at least one non-hydrolytically condensable silane substituent which contains a hydroxy or hydrolysable group bonded to a carbon atom, with water in the presence of a substance which functions as the catalyst for the hydrolysis of hydrolysable substituents and groups present in the mixture and as a crosslinking agent, said substance reacting with at least one said non-hydrolytically condensable silane substituent to form an ester group, and being selected from the group consisting essentially of (i) a polycarboxylic acid which is stable in contact with water and (ii) an anhydride which hydrolyzes to form said polycaboxylic acid, with the proviso that when said at least one non-hydrolytically condensable silane substituent is an epoxy group, at the beginning of the treatment, the mixture has a pH of less than or equal to 4.

45. A lacquer composition which comprises the product of a treatment of a mixture consisting essentially of an organosilane compound, which comprises at least two hydrolytically-condensable silane substituents, and at least one non-hydrolytically condensable silane substituent which contains a hydroxy or hydrolysable group bonded to a carbon atom, with water in the presence of a substance which functions as the catalyst for the hydrolysis of hydrolysable substituents and groups present in the mixture and as a crosslinking agent, said substance reacting with at least one said non-hydrolytically condensable silane substituent to form an ester group, and being selected from the group consisting essentially of maleic acid, fumaric acid, malonic acid, oxalic acid, adipic acid, tartaric acid, terephthalic acid, a benzene tricarboxylic acid and pyromellitic acid; and (ii) an anhydride which hydrolyzes to form said polycarboxylic acid;

with the proviso that when said at least one non-hydrolytically condensable silane substituent is an epoxy group, at the beginning of the treatment, the mixture has a pH of less than or equal to 4.

46. A lacquer composition which comprises the product of a treatment of a mixture consisting essentially of at least one organosilane compound, which comprises at least two hydrolytically-condensable silane substituents, and at least one non-hydrolytically condensable silane substituents which contains a hydroxy or hydrolysable group bonded to a carbon atom, and mixtures thereof with at least one additional hydrolytically condensable organosilane, with water in the presence of a substance which functions as the catalyst for the hydrolysis of hydrolysable substituents an and groups present in the mixture and as a crosslinking agent, said substance reacting with at least one said non-hydrolytically condensable silane substituent to form an ester group, and being selected from the group consisting essentially of (i) a polycarboxylic acid which is stable in contact with water and (ii) an anhydride which hydrolyzes to form said polycarboxylic acid, with the proviso that when said at least one non-hydrolytically condensable silane substituent is an epoxy group, at the beginning of the treatment, the mixture has a pH of less than or equal 4.

47. A lacquer composition which comprises the product of a treatment of a mixture consisting essentially of at least one organosilane compound, which comprises at least two hydrolytically-condensable silane substituents, and at least one non-hydrolytically condensable silane substituent which contains a hydroxy or hydrolysable group bonded to a carbon atom, and mixtures thereof with at least one additional hydrolytically condensable organosilane, with water in the presence of a substance which functions as the catalyst for the hydrolysis of hydrolysable substituents and groups present in the mixture and as a crosslinking agent, said substance reacting with at least one said non-hydrolytically condensable silane substituent to form an ester group, and being selected from the group consisting essentially of maleic acid, fumaric acid, malonic acid, oxalic acid, adipic acid, tartaric acid, terephthalic acid, a benzene tricarboxylic acid and pyromellitic acid; and (ii) an anhydride which hydrolyzes to form said polycarboxylic acid, with the proviso that when said at least one non-hydrolytically condensable silane substituent is an epoxy group, at the beginning of the treatment, the mixture has a pH of less than or equal to 4.

48. A lacquer composition of improved stability which comprises the product of a treatment of a mixture consisting essentially of 3-glycidyl-oxypropyltrimethoxysilane and tetra-alkylorthosilicate with water in the presence of a catalyst which is stable in contact with water, said catalyst reacting with at least one hydroxyl group of a vicinal diol that results from the hydrolysis of said 3-glycidyl-oxypropyltrimethoxysilane in the presence of said catalyst to form an ester group, said catalyst being selected from the group consisting essentially of (i) a polycarboxylic acid which is stable in contact with water and (ii) an anhydride which hydrolyzes to form said polycarboxylic acid, with the proviso that at the beginning of the treatment, the mixture has a pH of less than or equal to 4.

* * * * *